Patented May 14, 1929.

1,713,251

UNITED STATES PATENT OFFICE.

HENRY BLUMENBERG, JR., OF LOS ANGELES, CALIFORNIA.

FILTERING MATERIAL.

No Drawing.   Application filed August 10, 1927.   Serial No. 212,132.

My invention relates to a composition of matter intended as a filtering material.

It is an object of this invention to provide a filtering material which has superior purifying, bleaching and germicidal properties. It is adapted for the purification, clarification and deodorizing of mineral oil distillates, such as gasoline, kerosene and lubricating oils, but may also be used for the purification of water, industrial waste liquors and sewerage.

My invention consists of the composition of matter hereinafter described and claimed.

I mix calcium hypochlorite $Ca(OCl)_2$ with either potassium sulphate $K_2SO_4$, sodium sulphate $Na_2SO_4$, or magnesium sulphate $MgSO_4$; the proportions of any of the sulphates just mentioned being taken as expressed by their molecular weights to the molecular weight of calcium hypochlorite.

100 lbs. of the mixture of the sulphate and the calcium hypochlorite are ground to a fineness of 20–100 screen mesh and preferably mixed together with 10 to 30 pounds of an inert cellular material, preferably ground to a fineness of about 20 screen mesh, such as pumice, diatomaceous earth, charcoal, wood fibre, asbestos and the like, and formed into a homogenous mass.

Assuming that sodium sulphate is used in conjunction with the calcium hypochlorite, the mixture will not react in the dry state but only in the presence of water or when in contact with organic matter, forming calcium sulphate, sodium chloride and chlorine dioxide.

It is the chlorine dioxide which is the powerful oxidizing agent which clarifies and deodorizes the liquids to be treated and which acts as a germicide.

One-half to five percent, by weight, of the filtering material thus prepared is usually sufficient for the clarification and deodorization of mineral oil distillates. For the purification of water 25 pounds of the filtering material to one million gallons of water is sufficient. It should be noted that the chlorine dioxide in contradistinction to chlorine, which is sometimes used for water purification, leaves no disagreeable odor. The slight odor present resembles that of ozone.

In the treatment of industrial waste liquors and of sewerage, from 100 to 500 pounds of the filtering material are usually required per one million gallons.

The liquids to be treated are either passed through a layer of the filtering material under pressure or allowed to percolate by gravity.

Various changes may be made by those skilled in the art without departing from the spirit of my invention as claimed.

I claim:

1. A filtering material for use as a purifying, deodorizing and oxidizing agent, containing a soluble sulphate of an alkali producing metal, calcium hypochlorite, and an inert cellular material.

2. A filtering material for use as a purifying, deodorizing and oxidizing agent, containing a soluble sulphate of an alkali producing metal, calcium hypochlorite, and diatomaceous earth.

3. A filtering material for use as a purifying, deodorizing and oxidizing agent, containing sodium sulphate, calcium hypochlorite, and an inert cellular material.

4. A filtering material for use as a purifying, deodorizing and oxidizing agent containing the following ingredients in approximately the proportions stated:

|  | Pounds. |
|---|---|
| Sodium sulphate | 160 |
| Calcium hypochlorite | 142 |
| Diatomaceous earth | 30 to 90 |

In testimony whereof I have signed my name to this specification.

HENRY BLUMENBERG, JR.